(12) United States Patent
Tanaka et al.

(10) Patent No.: US 7,853,147 B2
(45) Date of Patent: Dec. 14, 2010

(54) INFORMATION PROCESSING SYSTEM, CALCULATION NODE, AND CONTROL METHOD OF INFORMATION PROCESSING SYSTEM

(75) Inventors: Toshiki Tanaka, Kawasaki (JP); Yasuhiko Aoki, Kawasaki (JP); Hideyuki Miyata, Kawasaki (JP); Takao Naito, Kawasaki (JP); Kouichiro Amemiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 867 days.

(21) Appl. No.: 11/145,918

(22) Filed: Jun. 7, 2005

(65) Prior Publication Data

US 2006/0171712 A1 Aug. 3, 2006

(30) Foreign Application Priority Data

Feb. 3, 2005 (JP) .............................. 2005-027935

(51) Int. Cl.
  *H04J 14/02* (2006.01)
  *H04J 14/00* (2006.01)
  *H04B 10/20* (2006.01)
(52) U.S. Cl. .............................. 398/57; 398/55; 398/56; 398/48; 398/49; 398/50
(58) Field of Classification Search ...................... 398/7, 398/57, 50, 56
  See application file for complete search history.

(56) References Cited

U.S. PATENT DOCUMENTS

| | | | | |
|---|---|---|---|---|
| 5,018,129 A | * | 5/1991 | Netravali et al. | 398/55 |
| 5,040,169 A | * | 8/1991 | Guerin et al. | 398/48 |
| 5,043,975 A | * | 8/1991 | McMahon | 398/58 |
| 5,351,146 A | * | 9/1994 | Chan et al. | 398/58 |
| 5,414,548 A | * | 5/1995 | Tachikawa et al. | 398/87 |
| 5,495,356 A | * | 2/1996 | Sharony et al. | 398/46 |
| 5,530,575 A | * | 6/1996 | Acampora et al. | 398/58 |
| 5,550,818 A | * | 8/1996 | Brackett et al. | 370/395.51 |
| 5,623,356 A | * | 4/1997 | Kaminow et al. | 398/46 |
| 5,701,371 A | * | 12/1997 | Ishida | 385/17 |

(Continued)

FOREIGN PATENT DOCUMENTS

JP  A-56-114457  9/1981

(Continued)

OTHER PUBLICATIONS

Kato et al. "Reconfiguration Procedures for Torus Lightwave Networks", Communications, 1998. ICC 98. Conference Record.1998 IEEE International Conference on Issue Date : Jun. 7-11, 1998 vol. 1 on pp. 531-536 vol. 1.*

(Continued)

*Primary Examiner*—Ken N Vanderpuye
*Assistant Examiner*—Danny W Leung
(74) *Attorney, Agent, or Firm*—Fujitsu Patent Center

(57) ABSTRACT

The present invention provides an information processing system, comprising a plurality of calculation nodes with an optical transmitter, which individually outputs a plurality of optical signals each having a different wavelength, and an optical receiver, which individually receives a plurality of optical signals each having a different wavelength, an optical transmission path connecting a plurality of the calculation nodes to each other, and optical pathway switching unit, lying in the optical transmission path, for transmitting the optical signal to the specific calculation node in accordance with a wavelength of the optical signal output from one of the calculation nodes.

4 Claims, 15 Drawing Sheets

U.S. PATENT DOCUMENTS

| | | | |
|---|---|---|---|
| 5,715,391 A * | 2/1998 | Jackson et al. | 712/11 |
| 5,754,320 A * | 5/1998 | Watanabe et al. | 398/50 |
| 5,826,033 A * | 10/1998 | Hayashi et al. | 709/238 |
| 5,838,848 A * | 11/1998 | Laude | 385/24 |
| 5,841,556 A * | 11/1998 | Hong et al. | 398/46 |
| 5,953,143 A * | 9/1999 | Sharony et al. | 398/46 |
| 6,065,065 A * | 5/2000 | Murakami et al. | 709/250 |
| 6,154,587 A * | 11/2000 | Okayama | 385/24 |
| 6,230,252 B1 * | 5/2001 | Passint et al. | 712/12 |
| 6,333,799 B1 * | 12/2001 | Bala et al. | 398/9 |
| 6,570,872 B1 * | 5/2003 | Beshai et al. | 370/369 |
| 6,574,386 B1 * | 6/2003 | Sufleta | 385/16 |
| 6,626,590 B1 * | 9/2003 | Nagatsu et al. | 398/59 |
| 6,631,134 B1 * | 10/2003 | Zadikian et al. | 370/395.21 |
| 6,690,848 B2 * | 2/2004 | Graves et al. | 385/16 |
| 6,714,552 B1 * | 3/2004 | Cotter | 370/406 |
| 6,718,140 B1 * | 4/2004 | Kamei et al. | 398/68 |
| 6,735,393 B1 * | 5/2004 | Zouganeli | 398/48 |
| 6,741,572 B1 * | 5/2004 | Graves et al. | 370/254 |
| 6,771,905 B1 * | 8/2004 | Bortz | 398/45 |
| 6,782,210 B1 * | 8/2004 | Okada et al. | 398/161 |
| 6,836,582 B2 * | 12/2004 | Penninckx et al. | 385/16 |
| 6,853,635 B1 * | 2/2005 | Beshai | 370/351 |
| 6,859,576 B2 * | 2/2005 | Kim et al. | 385/17 |
| 6,871,021 B2 * | 3/2005 | Graves et al. | 398/45 |
| 6,882,800 B1 * | 4/2005 | Graves | 398/46 |
| 6,888,975 B2 * | 5/2005 | Kim et al. | 385/16 |
| 6,925,257 B2 * | 8/2005 | Yoo | 398/47 |
| 6,950,391 B1 * | 9/2005 | Zadikian et al. | 370/219 |
| 6,957,018 B2 * | 10/2005 | Araki et al. | 398/51 |
| 6,999,677 B2 * | 2/2006 | Graves et al. | 398/5 |
| 7,024,070 B2 * | 4/2006 | Spivey et al. | 385/17 |
| 7,035,541 B2 * | 4/2006 | Graves et al. | 398/68 |
| 7,050,667 B2 * | 5/2006 | Graves et al. | 385/16 |
| 7,120,358 B2 * | 10/2006 | Okada et al. | 398/49 |
| 7,123,806 B2 * | 10/2006 | Jahn et al. | 385/134 |
| 7,155,120 B1 * | 12/2006 | Ofek et al. | 398/7 |
| 7,231,107 B1 * | 6/2007 | Zhong et al. | 385/24 |
| 7,245,829 B1 * | 7/2007 | Sindile | 398/45 |
| 7,266,295 B2 * | 9/2007 | Ovadia et al. | 398/51 |
| 7,277,648 B2 * | 10/2007 | Lanne et al. | 398/198 |
| 7,283,747 B2 * | 10/2007 | Schofield et al. | 398/57 |
| 7,298,974 B2 * | 11/2007 | Tanobe et al. | 398/63 |
| 7,315,693 B2 * | 1/2008 | Ovadia et al. | 398/57 |
| 7,340,169 B2 * | 3/2008 | Ovadia et al. | 398/57 |
| 7,346,277 B2 * | 3/2008 | Atkinson et al. | 398/7 |
| 7,389,046 B1 * | 6/2008 | Tanaka et al. | 398/45 |
| 7,400,832 B2 * | 7/2008 | Beacham et al. | 398/45 |
| 7,684,389 B2 * | 3/2010 | Beshai | 370/387 |
| 2002/0135835 A1 * | 9/2002 | Lauder et al. | 359/124 |
| 2004/0037558 A1 * | 2/2004 | Beshai | 398/57 |
| 2004/0042796 A1 * | 3/2004 | Con-Carolis et al. | 398/83 |
| 2004/0091264 A1 * | 5/2004 | Beshai | 398/47 |
| 2004/0190900 A1 * | 9/2004 | Yagyu | 398/57 |
| 2004/0196838 A1 * | 10/2004 | Zadikian et al. | 370/360 |
| 2004/0228629 A1 * | 11/2004 | Harris et al. | 398/79 |
| 2006/0098981 A1 * | 5/2006 | Miura et al. | 398/45 |
| 2006/0117208 A1 * | 6/2006 | Davidson | 714/4 |
| 2006/0171712 A1 * | 8/2006 | Tanaka et al. | 398/45 |
| 2006/0173983 A1 * | 8/2006 | Naito et al. | 709/223 |
| 2008/0075071 A1 * | 3/2008 | Beshai | 370/386 |
| 2008/0260386 A1 * | 10/2008 | Boduch et al. | 398/83 |
| 2009/0016332 A1 * | 1/2009 | Aoki et al. | 370/388 |
| 2009/0031316 A1 * | 1/2009 | Richoux | 718/102 |

FOREIGN PATENT DOCUMENTS

| | | |
|---|---|---|
| JP | A-05-151181 | 6/1993 |
| JP | B2-7-86864 | 9/1995 |
| JP | 1995-264165 | 10/1995 |
| JP | A-07-264165 | 10/1995 |

OTHER PUBLICATIONS

Saengudomlert et al. "On-line routing and wavelength assignment for dynamic traffic in WDM ring and torus networks", INFOCOM 2003. Twenty-Second Annual Joint Conference of the IEEE Computer and Communications. IEEE Societies; Issue Date : Mar. 30-Apr. 3, 2003 vol. 3 on pp. 1805-1815 vol. 3.*

Banerjee et al. "The multidimensional torus: analysis of average hop distance and application as a multihop lightwave network", Communications, 1994. ICC '94, SUPERCOMM/ICC '94, Conference Record, 'Serving Humanity Through Communications.' IEEE International Conference on, Issue Date : May 1-5, 1994 On pp. 1675-1680 vol. 3.*

Office Action from JPO; Japanese Patent Application No. 2005-027935 Notice of Rejection Ground dated Sep. 4, 2007 with Eng. Translation.

"IEICE Technical Report, CS2002-63, vol. 102 No. 257", Jul. 26, 2002, Partial English Translation.

"Japanese Decision of Rejection", Translated Part: Remarks, for corresponding JP Patent Application No. 2005-027935, mailed Aug. 19, 2008. This is the certificate of the correct publication date of the Yasutaka Okazaki et al. reference as submitted on Dec. 28, 2007.

* cited by examiner

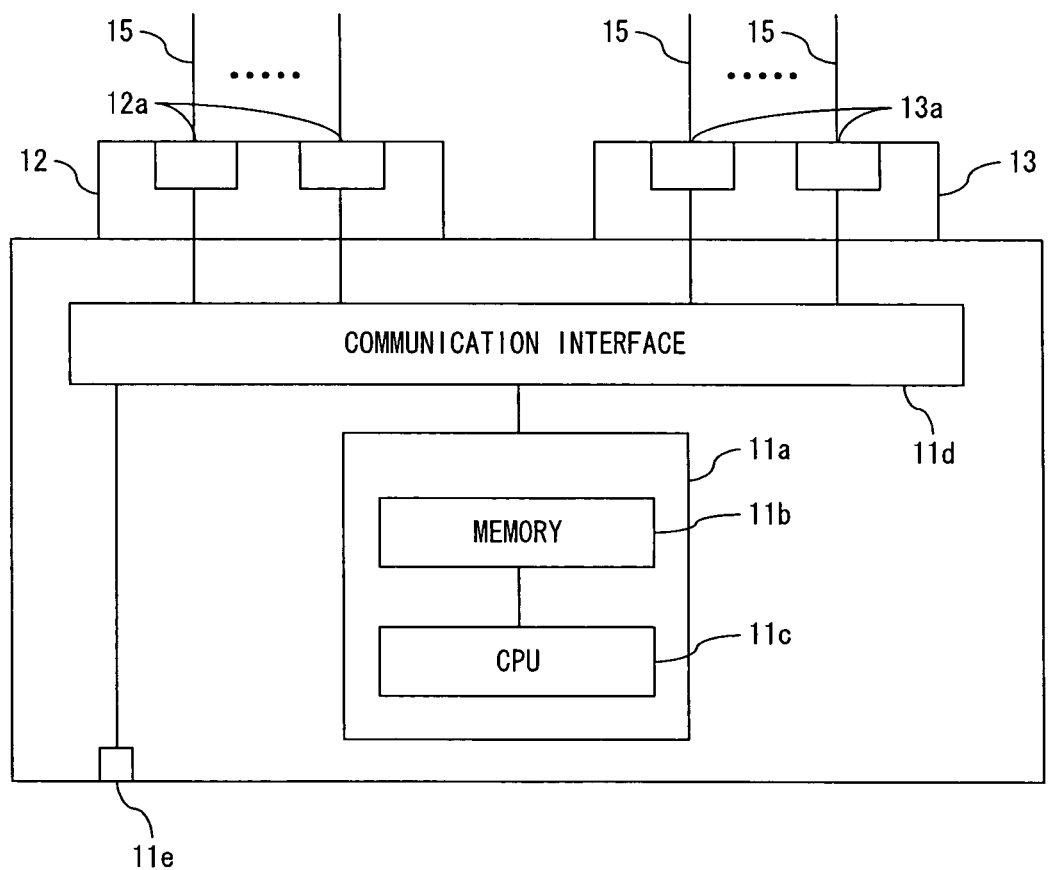
F I G. 2

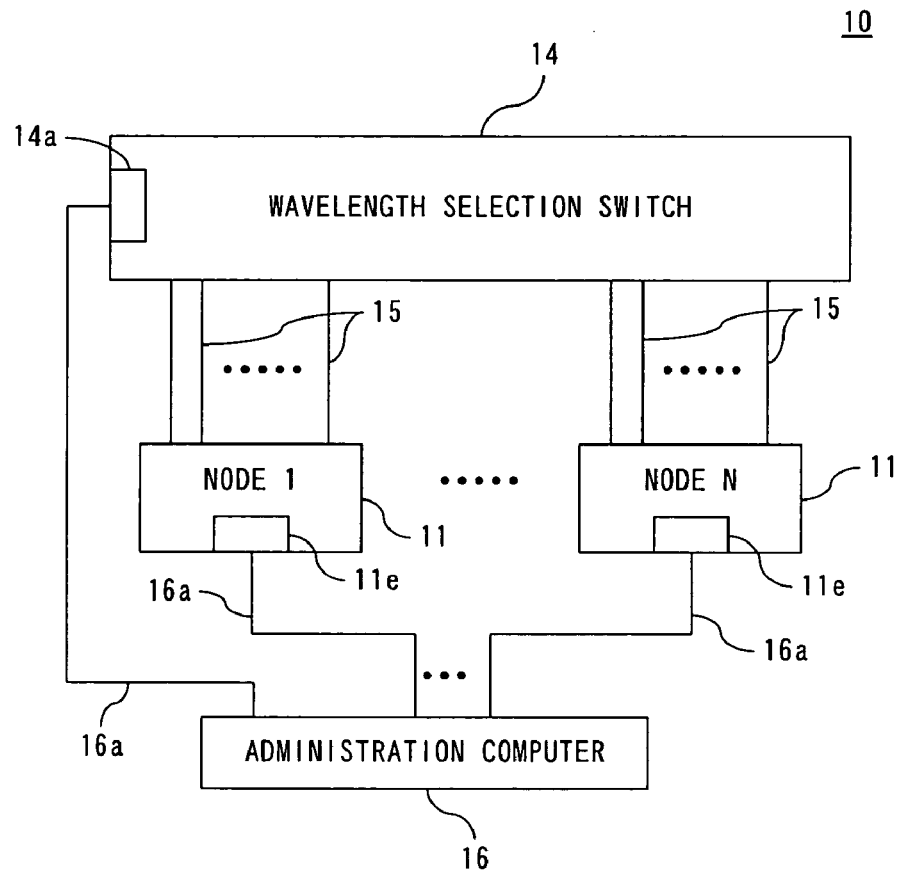
F I G. 3

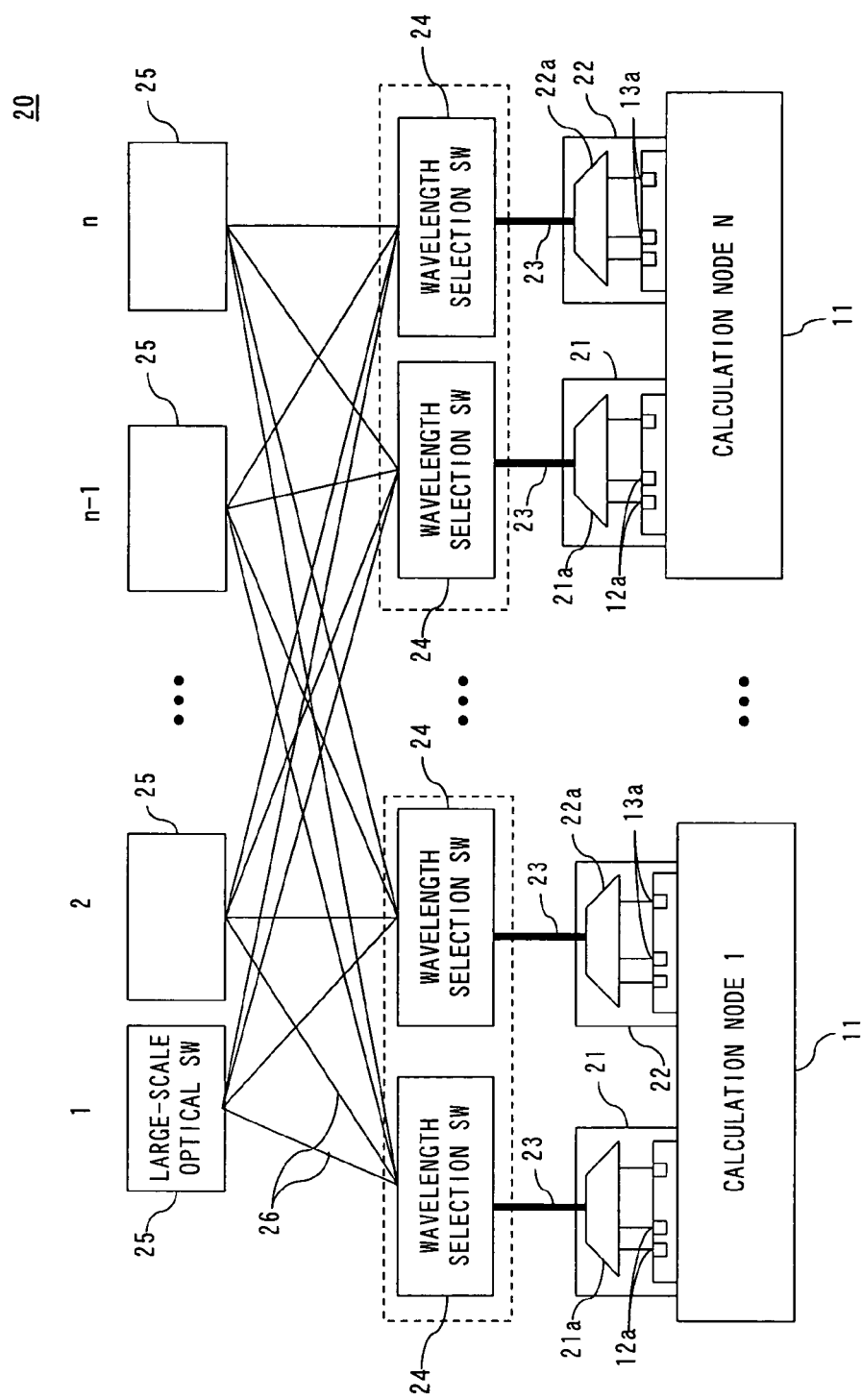
F I G. 4

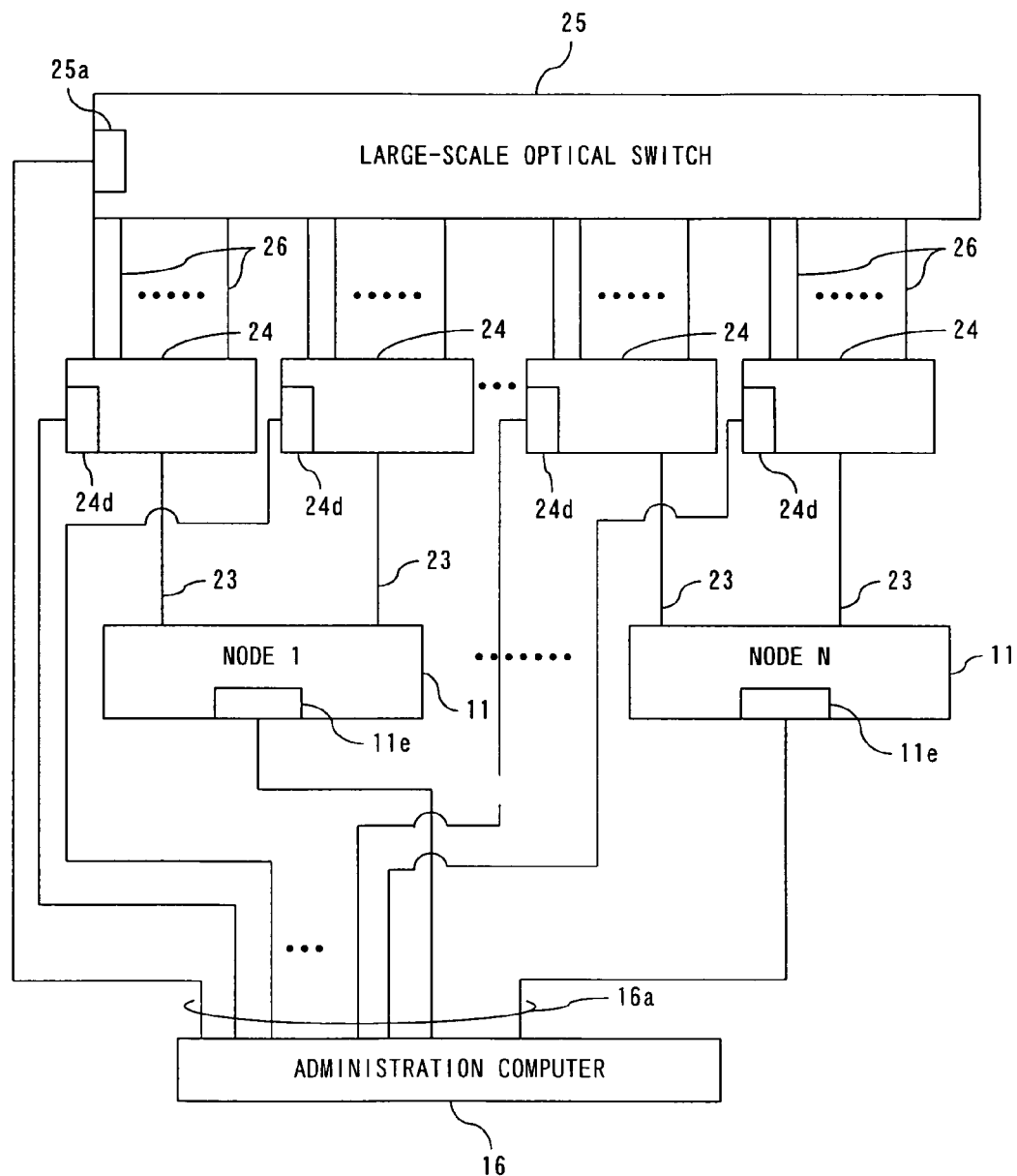
F I G. 6

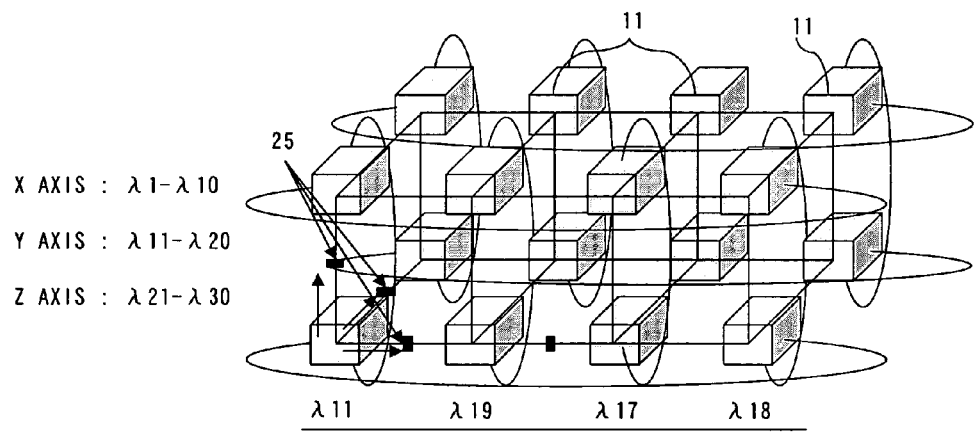
F I G. 7

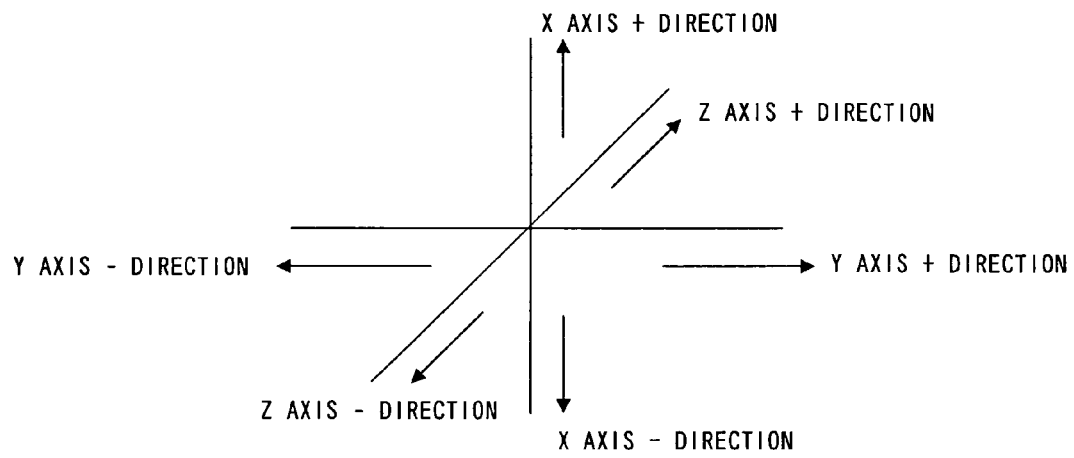
F I G. 8

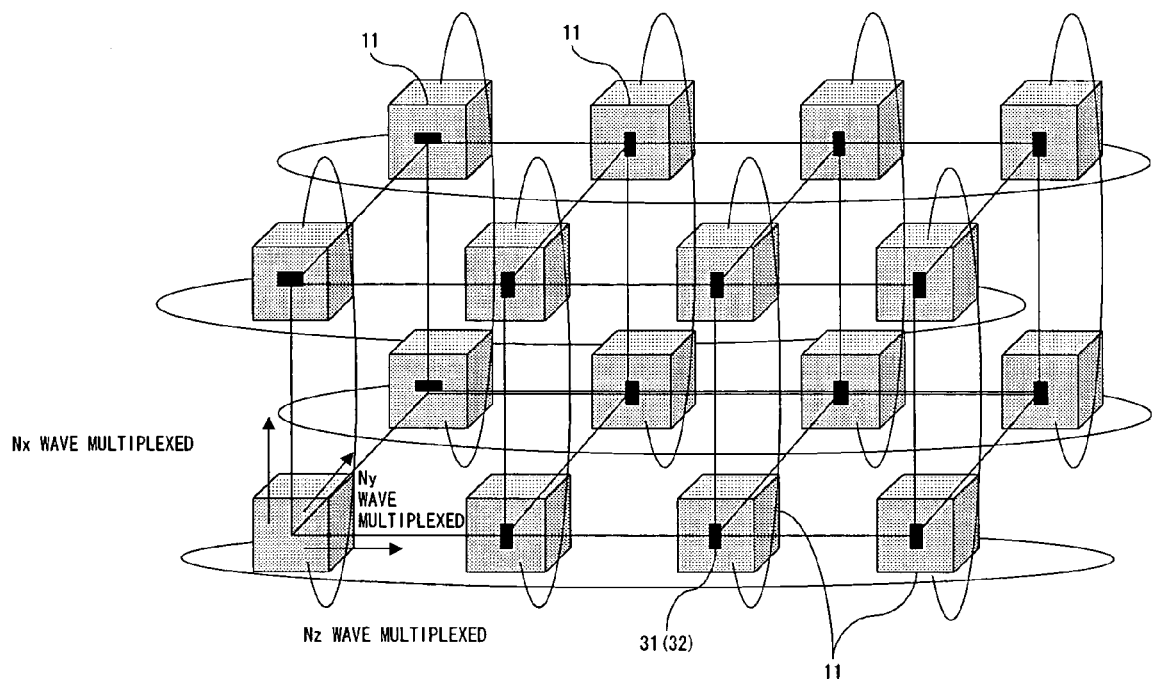
F I G. 1 1

INFORMATION PROCESSING SYSTEM, CALCULATION NODE, AND CONTROL METHOD OF INFORMATION PROCESSING SYSTEM

BACKGROUND OF THE INVENTION

1. Field of the Invention

The present invention relates to an information processing system, calculation nodes, a control method of the information processing system, and more specifically, to an effective technology applied to information processing technology etc. such as parallel processing by load sharing using a plurality of calculation nodes.

2. Description of the Related Art

High-performance computers, which can imitate various physical phenomena in nature or in manufactured products as realistically as possible, are used for design and simulation in fields of nuclear energy, automotive engineering, marine vessel engineering, aeronautics, high-rise building design and so forth. In recent years, they are also utilized in biological and chemical fields such as molecular design and gene analysis, and the sites where they are utilized are not only universities and research institutions but also business enterprises.

For a method of realizing the above high-performance computers, in order to speed up a massive number of repeated operations such as matrix calculations, often used in scientific and technological fields, a method of performing parallel processing using a special kind of computer, called a vector processor, had been the mainstream. However, drastic performance gains and reduction in price of microprocessors of general purpose computers has recently caused an increased use of a parallel processing method, which has a large number of microprocessors operating in parallel.

In such a parallel processing method, which has a large number of microprocessors operating in parallel, the performance of the network inter-connecting the microprocessors and improvements in the communication efficiency thereof influence the performance of the high-performance computers.

A technology disclosed in Patent Document 1, for example, has been heretofore known as a technology relating to such a parallel processing method.

In a technology in Patent Document 1, in all-to-all communication where all of a plurality of processors constituting a parallel computer, transmit different messages to other processors, phase control means according to the number of processors constituting a parallel computer is provided to each processor. Predetermined information relating to a transmission source processor and a transmission destination processor determined in advance are stored in the phase control means, in execution of all-to-all communication, each processor determine its own transmission timing for each phase by referring to the phase control means. By so doing, conflict of the communication on a Torus network inter-connecting the processors can be avoided, realizing efficient all-to-all communication.

The technology in Patent Document 1 is useful from the point of avoiding conflict between processors on a communication path, however increase in communication capacity in the communication path connecting the processors is not considered.

Therefore, in order to improve performance of a parallel computer, it is required to increase the communication capacity between processors (nodes). Flexible and high-speed change of communication capacity between nodes is also required due to frequent changes in communication capacity between connected nodes.

Meanwhile, for further improvement of a parallel computer, it is required to have a higher degree of parallelism of a number of processors. In such a case, an attempt to connect a large number of nodes by multiplexing communication cables alone would require laying a large number of cables, causing problems such as an increase in implementation space and complications of control. Therefore, it is crucial to reduce the number and the length of the communication cables. Patent Document 1: Japanese unexamined patent publication bulletin No. 05-151181

SUMMARY OF THE INVENTION

It is an object of the present invention to provide a technology, which allows flexible and high-speed change of communication capacity in a communication path between calculation nodes in an information processing system performing parallel processing using a plurality of the calculation nodes connected through a communication path.

It is another object of the present invention to provide a technology, which can realize an improvement in the performance of the information processing system by increasing the number of calculation nodes without increasing the number and the size of communication cables.

It is the first aspect of the present invention to provide an information processing system, comprising a plurality of calculation nodes with an optical transmitter, which individually outputs a plurality of optical signals with different wavelengths, and an optical receiver, which individually inputs a plurality of optical signals with different wavelengths, an optical transmission path connecting a plurality of calculation nodes to each other and optical pathway switching unit, lying in the optical transmission path, for transmitting the optical signal to the particular calculation node in accordance with the wavelength of the optical signal output from one of the calculation nodes.

It is the second aspect of the present invention to provide an information processing system with a plurality of calculation nodes connected to each other through an optical transmission path, in which the optical transmission path comprising a first optical path switching unit for switching the connection between a plurality of the calculation nodes and second optical path switching unit for wavelength division multiplexing optical signals transmitted and received between a plurality of the calculation nodes and for variably controlling communication capacity to the calculation node of an individual connection destination in units of wavelength.

It is the third aspect of the present invention to provide an information processing system, comprising a plurality of calculation nodes with an optical transmitter, which individually outputs a plurality of optical signals with different wavelengths, and an optical receiver, which individually inputs a plurality of optical signals with different wavelengths, to an optical transmission path connecting a plurality of the calculation nodes to each other and a wavelength selection switch, lying on the optical transmission path, for transmitting the optical signal to the specific calculation node in accordance with the wavelength of the optical signal output from one of the calculation nodes.

It is the fourth aspect of the present invention to provide an information processing system comprising a plurality of calculation nodes with an optical transmitter, which individually outputs a plurality of optical signals with different wavelengths, and an optical receiver, which individually receives a plurality of optical signals with different wavelengths, an optical transmission path connecting a plurality of the calculation nodes to each other, optical path switching unit, lying on the optical transmission path, for transmitting the optical signal to the particular calculation node in accordance with the wavelength of the optical signal output from one of the calculation nodes and unit for multiplexing optical signals output from the calculation nodes and for switching pathways of the multiplexed optical signals at one time.

It is the fifth aspect of the present invention to provide an information processing system, comprising a plurality of calculation nodes with an optical transmitter, which individually outputs a plurality of optical signals each having a different wavelength, and an optical receiver, which individually receives a plurality of optical signals each having a different wavelength, an optical transmission path connecting a plurality of the calculation nodes to each other, a plurality of wavelength selection switches, lying in the optical transmission path, which are connected to each of the optical transmitter and the optical receiver and an optical switch, lying on the optical transmission path, which connects a plurality of the wavelength selection switches to each other.

It is the sixth aspect of the present invention to provide a calculation node, which constitutes an information processing system by being connected to the other calculation nodes through optical path switching unit and comprises an optical transmitter, individually outputting a plurality of optical signals with different wavelengths and an optical receiver, individually inputting a plurality of optical signal with different wavelengths.

It is the seventh aspect of the present invention to provide an information processing system control method in which each of a plurality of calculation nodes, comprising an optical transmitter, which individually outputs a plurality of optical signals with different wavelengths and an optical receiver, which individually inputs a plurality of optical signals with different wavelengths, are connected to each other through optical path switching unit, and by the optical path switching unit, transmission pathways of the optical signals between a plurality of the calculation nodes are switched in units of individual wavelength and/or in units of the multiplexed wavelength.

It is the eighth aspect of the present invention to provide an information processing system control method, which connects a plurality of calculation nodes to a 3-dimensional-Torus configuration through optical transmission pathways and optical path switching unit, assigns the optical signals in groups of different wavelengths to each of positive and negative connection directions of three axes, X, Y and Z, in the Torus connection and performs communication between the calculation nodes by wavelength division multiplexing.

According to the present invention described above, it is possible to drastically reduce the number and the length of optical fibers between calculation nodes by connecting the calculation nodes with an optical communication path such as optical fiber as well as by wavelength division multiplexing the optical signals transmitted and received between the calculation nodes through the optical communication path. As a result, performance gain of the information processing system can be realized by increasing the number of calculation nodes without increasing the number and length of the optical fibers.

Because flexible and high-speed change of communication capacity between the calculation nodes in units of wavelength according to the roles of the individual calculation nodes and the communication destination calculation node is possible, it is also possible to promote efficiency of the network between the calculation nodes. In addition, in response to requests from application programs etc., which are to be executed by the information processing system, change etc. of the system architecture composed of a plurality of calculation nodes can be realized with facility and rapidity.

For example, because change in network configuration can be achieved at high-speed, a physical distance (the number of calculation nodes passed through in communication between two calculation nodes) can be drastically reduced, if necessary, by change in configuration, and thus delays in internal processing, which occur in each calculation node and transmission delay, can be decreased.

BRIEF DESCRIPTION OF THE DRAWINGS

FIG. 2 is a conceptual diagram showing an example of a configuration of a calculation node constituting the information processing system of the present embodiment;

FIG. 3 is a conceptual diagram of an example of an entire configuration of the information processing system of the present embodiment;

FIG. 4 is a conceptual diagram of a modified example of the configuration of the information processing system of the present embodiment;

FIG. 6 is a conceptual diagram of an example of the entire configuration of a modified example of the information processing system of the present embodiment;

FIG. 7 is a conceptual diagram showing an example of a configuration in which the calculation nodes are connected in 3-D Torus in the information processing system of the present embodiment;

FIG. 8 is an explanatory diagram showing an example of defining the axes of the 3-D Torus;

FIG. 11 is a conceptual diagram explaining an example of control when the calculation nodes are connected in 3-D Torus;

DESCRIPTION OF THE PREFERRED EMBODIMENT

For realizing connection of a plurality of calculation nodes constituting a parallel computer, possible connection topologies are mainly a crossbar connection, a full-mesh connection and a Torus connection. Therefore, in each of the following embodiments of the present invention, a configuration, which enables an increase in communication capacity between calculation nodes and flexible connection change, is exemplified in relation to the each of the above connection topologies. In order to achieve an increase in capacity and a decrease in the number and the length of the cables, a combination of fiber multiplexing and wavelength division multiplexing is required and is effective as in the following description of each embodiment of the present invention.

In each embodiment of the present invention, a high-capacity connection between nodes and technical advancement of a high-performance computer are realized by combining both a large-scale optical switch, which controls the fiber multiplexing, and a wavelength selection switch, which controls the wavelength division multiplexing.

In the following description, details of the embodiments of the present invention are set forth with reference to drawings.

Figure 1:
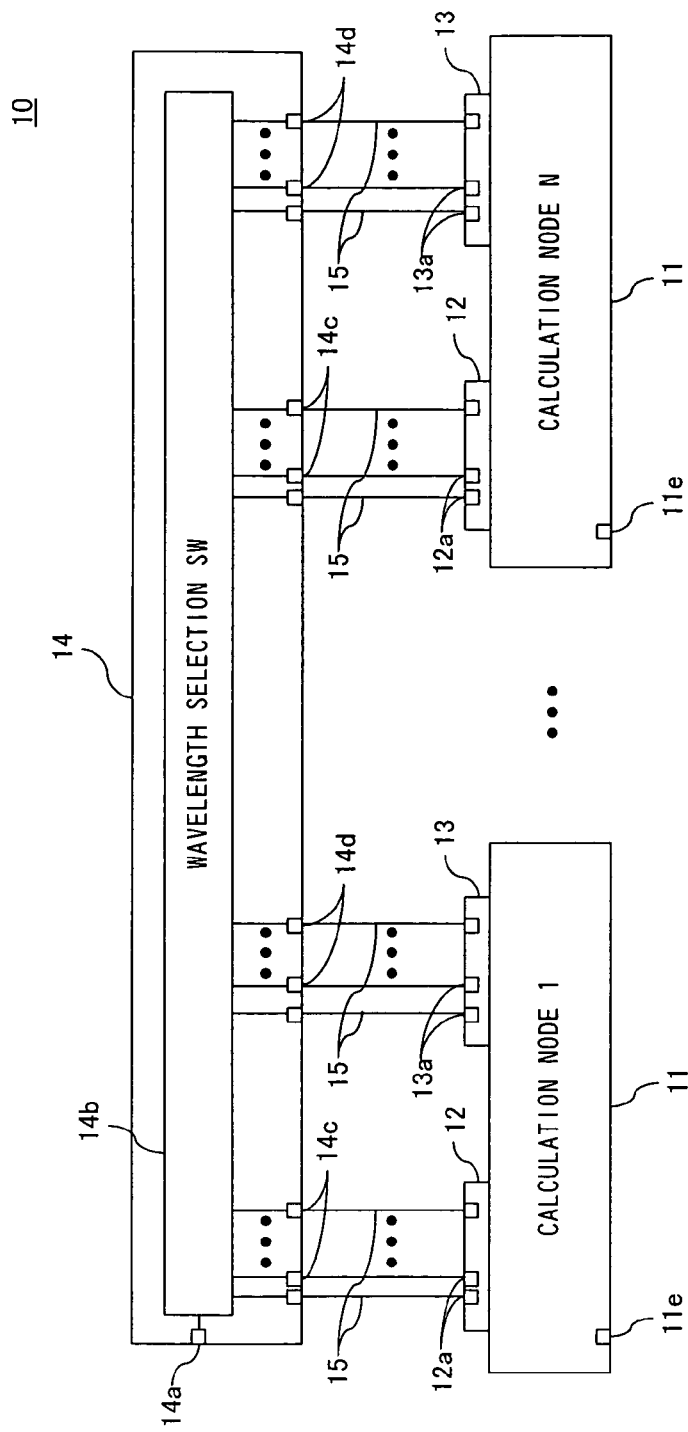
FIG. 1 is a conceptual diagram showing an example of a configuration of an information processing system of an embodiment of the present invention.

FIG. 1 is a conceptual diagram showing an example of a configuration of an information processing system of an embodiment of the present invention, FIG. 2 is a conceptual diagram showing an example of a configuration of a calculation node constituting the information processing system of the present embodiment, and FIG. 3 is a conceptual diagram of an example of the entire configuration of the information processing system of the present embodiment.

FIG. 1 describes an example of an information processing system 10 with the crossbar connection topology using a wavelength selection switch.

In other words, in the information processing system 10 of the present embodiment, a plurality of calculation nodes 11 constitutes a parallel computer system by being connected to each other through optical fiber 15 and a wavelength selection switch 14. A plurality of the calculation nodes 11 distributes calculation load and performs parallel processing. In each calculation node 11, transmission/reception of content to be computed on by the calculation nodes 11 and the response of the result of the computation can be performed as a message exchange through the optical fiber 15 and the wavelength selection switch 14.

The wavelength selection switch 14 comprises a matrix switch 14b, and the matrix switch 14b carries out an operation to selectively output an optical signal input from an input port 14c to an arbitrary output port 14d. The input port 14c has input pairs inputting optical signals with specific wavelengths, which are different from each other, and the number of pairs is the same as the number of the connected calculation nodes 11. Likewise, the output port 14d has output pairs outputting optical signals with specific wavelengths, which are different from each other, and the number of pairs is the same as the number of the connected calculation nodes 11.

The matrix switch 14b connects a plurality of the calculation nodes 11 in a crossbar connection by performing connection switch operation of many-to-many optical pathways guiding an optical signal input from each of the input port 14c to an arbitrary output port 14d.

The matrix switch 14b can be, for example, configured as a plurality of movable micro-mirrors with the cross-sectional area of an optical fiber, composed using a precise processing technology such as MEMS (Micro-Electro Mechanical System), a driving circuit system driving the movable mirrors with static electricity etc., and an optical system collecting optical signals incoming to/outgoing from the movable mirrors.

By changing the inclination of the movable mirrors, the operation of guiding an incoming optical signal from a particular input port 14c to a particular output port 14d can be performed. The setting and control of the inclination operation of the movable mirrors is possible externally through a control port 14a.

Individual calculation node 11 comprises an optical signal output unit 12 and an optical signal input unit 13.

The optical signal output unit 12 of the calculation node 11 comprises a plurality of fixed wavelength transmitter 12a, which output optical signals with different wavelengths, and the individual optical signal output unit 12 is connected to the input port 14c of the wavelength selection switch 14 through the optical fiber 15.

The optical signal input unit 13 of the calculation node 11 comprises a plurality of fixed wavelength receiver 13a, which individually receives optical signals with different wavelengths, and the individual optical signal input unit 13 is connected to the output port 14d of the wavelength selection switch 14 through the optical fiber 15.

As shown in FIG. 2, the individual calculation node 11 comprises a computation core 11a, a communication interface 11d for connecting the computation core 11a to the above optical signal output unit 12 and the optical signal input unit 13. The computation core 11a, for example, comprises a CPU 11c executing computation, and memory 11b, storing information such as data and program control, which controls the CPU 11c.

The communication interface 11d is connected to a control port 11e, and therefore it is possible to control the computation core 11a from outside.

As shown in FIG. 3, in the information processing system 10 of the present embodiment, the wavelength selection switch 14 and a plurality of calculation nodes 11 connected to each other through the wavelength selection switch 14 are controlled by an administration computer 16 operated by a system administrator.

The administration computer 16 is connected to the control port 14a of the wavelength selection switch 14 and the control port 11e of the calculation nodes 11 through control lines 16a, and through the control lines 16a, it controls the operation of the wavelength selection switch 14 and the individual calculation node 11.

The information processing system 10 shown in FIG. 1, as described above, adopts a many-to-many wavelength selection switch 14, and as multiple wavelength optical signals enter the wavelength selection switch 14 from one of the calculation nodes 11, the multiple wavelength optical signals are input to one of the calculation nodes 11 via the wavelength selection switch 14. Here, an optical signal output from a calculation node 11 is blocked at the wavelength selection switch 14 so that the calculation node 11, which output the optical signal, does not receive the output optical signal. It is possible for optical signals output from each of the calculation nodes 11 to flexibly change the communication destination calculation node 11 in units of wavelength in the wavelength selection switch 14.

The administration computer 16 carries out the setting of the estimated required number of calculation nodes 11, and the calculation results of the shortest routes to the of the required number of calculation nodes 11, according to a scale etc. of an application program such as a simulation program executed in the calculation nodes 11, and the control port 14a based on the architecture, and the matrix switch 14b of the wavelength selection switch 14 through the control lines 16a.

The process of the administration computer 16 setting the matrix switch 14b of the wavelength selection switch 14 can be automatically carried out by the administration computer 16 by request from the calculation nodes 11 executing the application program, or according to a scale of the application program, it can also be carried out by the system administrator by manual effort in advance.

The administration computer 16 carries out the processing, such as loading the application program, the execution start instruction and collecting the calculation result, in a plurality of the calculation nodes 11 through the control ports 11e and the control lines 16a.

Next, an example of an information processing system 20 configured as a parallel computer composed of a plurality of the calculation nodes 11 in a full mesh connection is shown in FIG. 4. In the example of the configuration in FIG. 4, a plurality of calculation nodes 11 are connected in a full-mesh connection so that an individual calculation node 11 can perform information communication simultaneously with and independently of all of the other calculation nodes 11 through a plurality of wavelength selection switches 24 (second optical path switch unit) and large-scale optical switches 25 (first optical path switch unit).

That is, the individual wavelength selection switch 24 is connected to an optical signal output unit 21 or an optical signal input unit 22 of the calculation nodes 11 through an optical fiber 23 propagating a wavelength division multiplexed optical signal (WDM signal). And the wavelength selection switch 24 is connected to the large-scale optical switch 25 through an optical fiber 26 propagating the wavelength division multiplexed signal.

The optical signal output unit 21 of the individual calculation node 11 comprises a fixed wavelength transmitter 12a and a multiplexer 21a for wavelength division multiplexing a plurality of optical signals with different wavelengths output from the fixed wavelength transmitters 12a and transmitting the multiplexed output.

The optical signal output unit 22 of the individual calculation node 11 comprises a plurality of fixed wavelength receivers 13a and a demultiplexer 22a for demultiplexing the wavelength division multiplexed optical signal into each wavelength and inputting the optical signal originating from the optical fiber 23 to each fixed wavelength receiver 13a of the corresponding wavelength.

Figure 5:
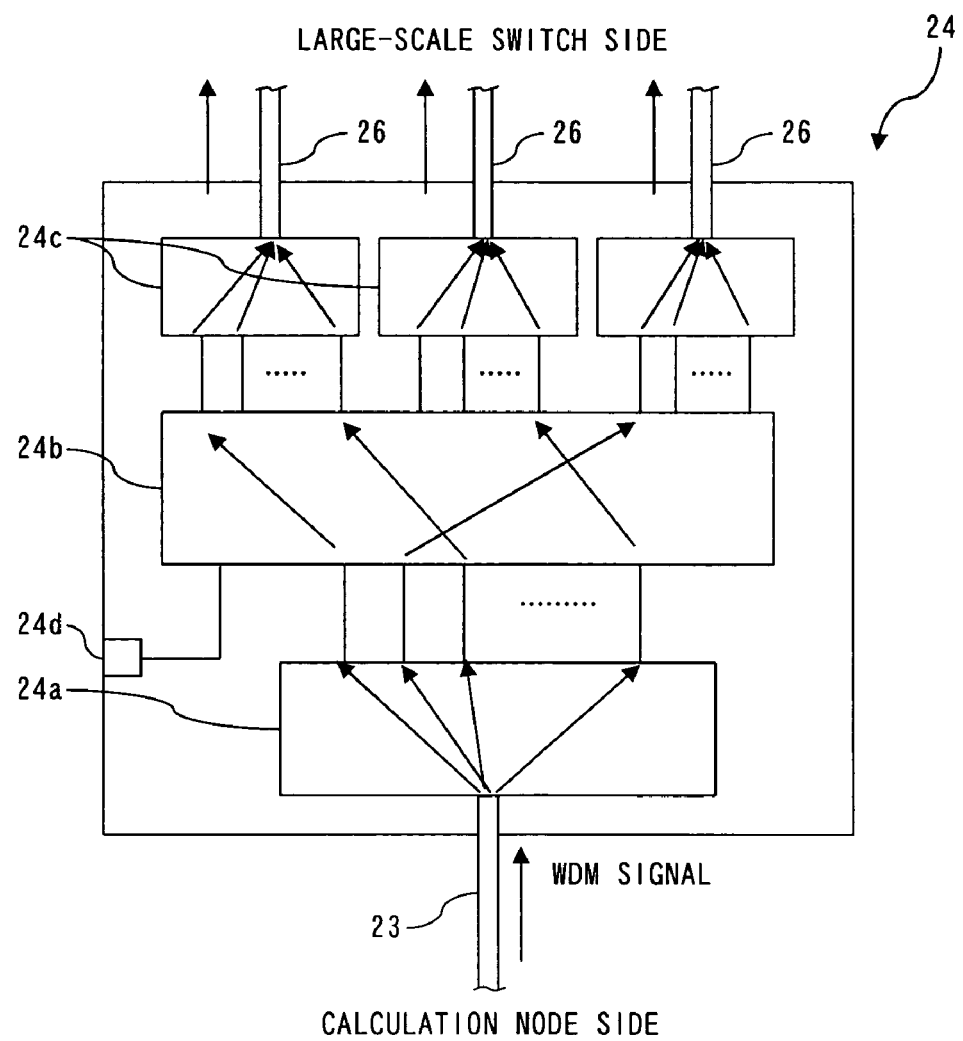
FIG. 5 is a conceptual diagram of an example of configuration of the wavelength selection switch constituting the information processing system of the present embodiment.

As shown in FIG. 5, the individual wavelength selection switch 24 comprises a wavelength division multiplexer/demultiplexer 24a to which the optical fiber 23 is connected, wavelength division multiplexers/demultiplexers 24c to which the optical fiber 26 is connected and a matrix switch 24b, which switches the routes of the optical signals with different wavelengths between the wavelength division multiplexer/demultiplexer 24a and the wavelength division multiplexer/demultiplexers 24c.

Setting and changes in the route switching operation of the matrix switch 24b can be controlled externally via the control port 24d.

As exemplified in FIG. 5, when the wavelength selection switch 24 lies between an optical signal output unit 21 and a large-scale optical switch 25, the wavelength division multiplexer/demultiplexer 24a operates as a demultiplexer, demultiplexing a WDM signal originating from the optical fiber 23 into each wavelength, and the wavelength division multiplexer/demultiplexer 24c functions as a multiplexer, multiplexing a plurality of optical signals with different wavelengths and transmitting the multiplexed output to the optical fiber 26.

When the wavelength selection switch 24 lies between the optical signal input unit 22 of the calculation node 11 and the large-scale optical switch 25, due to the opposite flow of the optical signal from the flow in FIG. 5, the wavelength division multiplexer/demultiplexer 24c functions as demultiplexer, and the wavelength division multiplexer/demultiplexer 24a functions as multiplexer.

The large-scale optical switch 25 to which the wavelength selection switch 24 is connected through the optical fiber 26, not shown in FIG. 5, carries out switching operations of the connections of the optical fibers 26 corresponding to the individual calculation nodes 11 in the matrix switch configured employing the above MEMS technology. Switching/setting of the matrix switch can also be controlled externally through the control port 25a.

FIG. 6 describes an example of the entire configuration of the information processing system 20 shown in FIG. 4. A plurality of the calculation nodes 11, the wavelength selection switch 24 and the large-scale optical switch 25 are connected to the administration computer 16 through the control line 16a connected to the control port 11e, the control port 24d and the control port 25a, and with this administration computer 16, administration and control of the entire information processing system 20 is carried out. In FIG. 6, although the control lines and main signal lines are displayed separately, the control signal can be transmitted/received over the main signal line. In such a case, for example, there is a method to avoid interference between the control signal and the main signal by assigning a wavelength for the control signal.

The wavelength selection system 20 of the administration computer 16 and setting and control of the large-scale optical switch 25 can be carried out by the manual effort of a system administrator operating the administration computer 16, or automatically carried out by the administration computer 16 on demand from the calculation nodes 11.

In the information processing system 20, the optical signal, output from the optical signal output unit 21 of the calculation nodes 11, can change the destination calculation node 11 for each wavelength at the wavelength selection switch 24. In the large-scale optical switch 25, routes with a plurality of wavelength division multiplexed signals, which were selected in the wavelength selection switch 24 can be changed all at once.

The above information processing system 20, compared with the crossbar connection of the information processing system 10 (FIG. 1), has an increased number of optical fiber, can switch connection routes between a plurality of calculation nodes 11 in two steps; which are switching in units of wavelength in the wavelength selection switch 24 and switching in units of wavelength division multiplexed signals in the large-scale optical switch 25, and for example, broadcast (multicasting service) transmitting the same information from one of the calculation nodes 11 to all of the other calculation nodes 11 can be easily realized.

In addition, whereas the wavelength selection switch 14 of the information processing system 10 (FIG. 1) must be realized in a many-to-many configuration, the wavelength selection switch 24 of the information processing system 20 (FIG. 4) realizes a one-to-many configuration and therefore a module of the wavelength selection switch 24 itself can be made more easily. Here, the wavelength selection switches 24 used in a transmission side and a reception side can be configured as one module, or can be separated. FIG. 4 shows an example of the separated module.

FIG. 7 shows a conceptual diagram in which a plurality of the calculation nodes 11 are logically connected in a 3D-Torus by the connection setting of the wavelength selection switch 24 and the large-scale optical switch 25 in the information processing system 20.

Definitions of the X-axis, the Y-axis and the Z-axis in the 3D-Torus are shown in FIG. 8. The three axes are defined as in FIG. 8, and outputs in two directions, i.e. + direction and − direction, of each axis are also defined. Then, communication between the calculation nodes 11 are performed by assigning optical signals with different wavelengths to each direction of each axis.

The path and the number of wavelengths from the individual calculation nodes 11 varies at the wavelength selection switch 24, the wavelength and the number of wavelengths (the number of signals) received by the individual calculation node 11 varies at the wavelength selection switch 24, and therefore communication capacity output to each axis of the Torus can be flexibly changed. That is, in the example of FIG. 7, it is shown that communication of the individual calculation nodes 11 on the X axis use optical signals with wavelengths $\lambda 1$~$\lambda 10$, those of the individual calculation nodes 11 on the Y axis use optical signals with wavelengths $\lambda 11$~$\lambda 20$, and those of the individual calculation nodes 11 on the Z axis use optical signals with wavelengths $\lambda 21$~$\lambda 30$.

If each calculation node 11 is connected by a 3D-Tourus, connection between adjacent calculation nodes 11 can be achieved at high speed, however, connection between distant calculation nodes 11 has a long delay time due to routing at each calculation node 11. Consequently, it is required to reduce the number of routed calculation nodes 11 when communication between the distant calculation nodes 11 is frequent. In the case of the information processing system 20 of the present embodiment, by varying the destinations to which each adjacent node is connected by the large-scale optical switch 25, the distance between the calculation nodes 11 can be reduced, allowing efficient communication.

Figure 9:
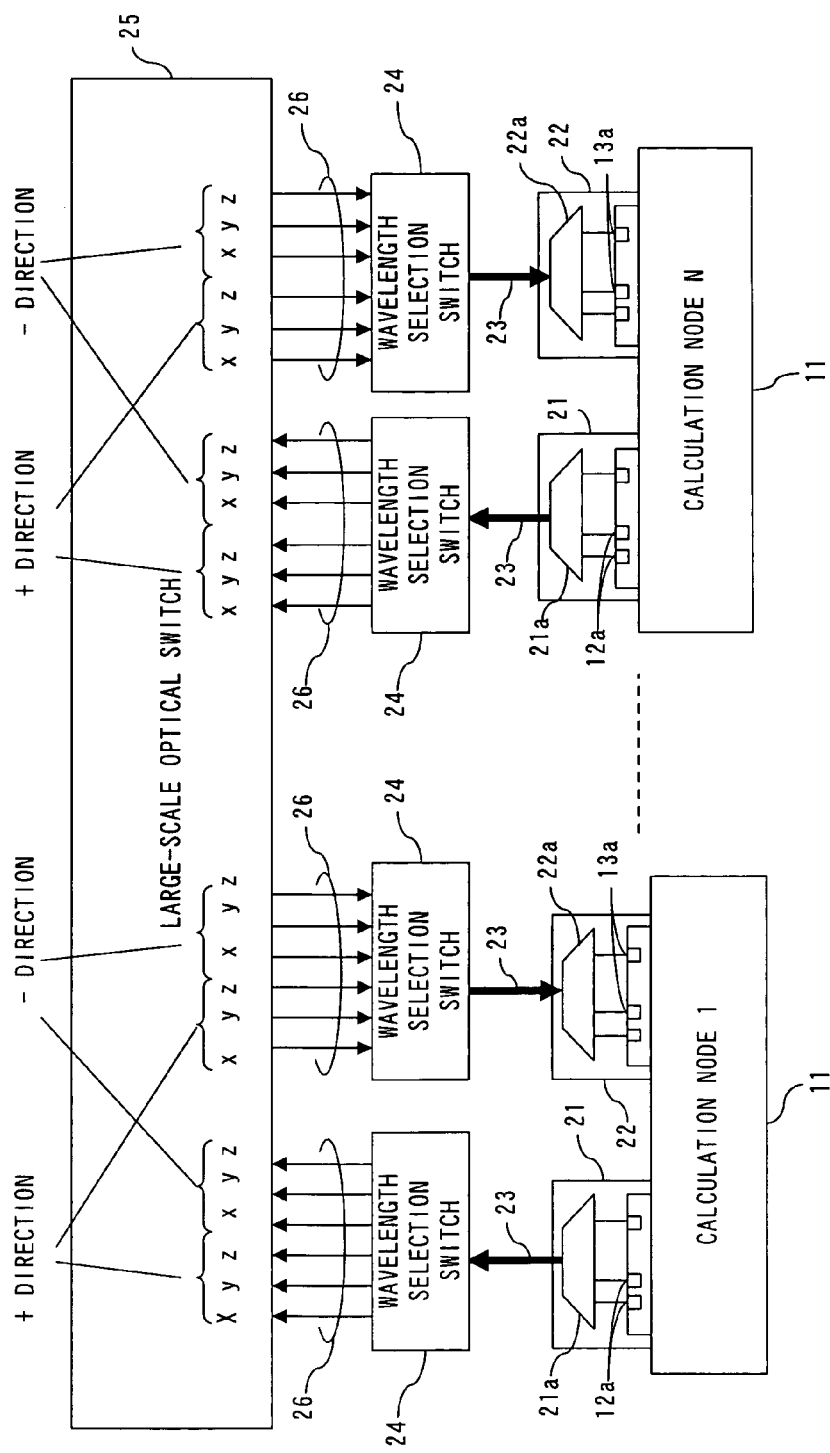
FIG. 9 is a conceptual diagram of an example of configuration of the information processing system when the calculation nodes are connected in a 3-D Torus.

An example of a configuration to realize the 3D-Torus in FIG. 7 is shown in FIG. 9. After multiplexing a plurality of fixed wavelength signals output from one of the calculation nodes 11 by the multiplexer 21a (wavelength division multiplexer), they are input to the wavelength selection switch 24, and the axis directions of the 3D-Torus are selected for each wavelength. The routes of the wavelength division multiplexed signals output to each axis direction are changed by the large-scale optical switch 25. The wavelength division multiplexed signals, output to the receiving calculation node 11, are input to the fixed wavelength receiver 13a via the wavelength selection switch 24 and the demultiplexer 22a of the optical signal input unit 22, and the signals are consequently received by the computation core 11a of the calculation node 11.

In the example of FIG. 9, an example using the fixed wavelength transmitter 12a for the optical signals from the individual calculation node 11 is shown however it is not limited to the transmitter of the example.

Figure 10:
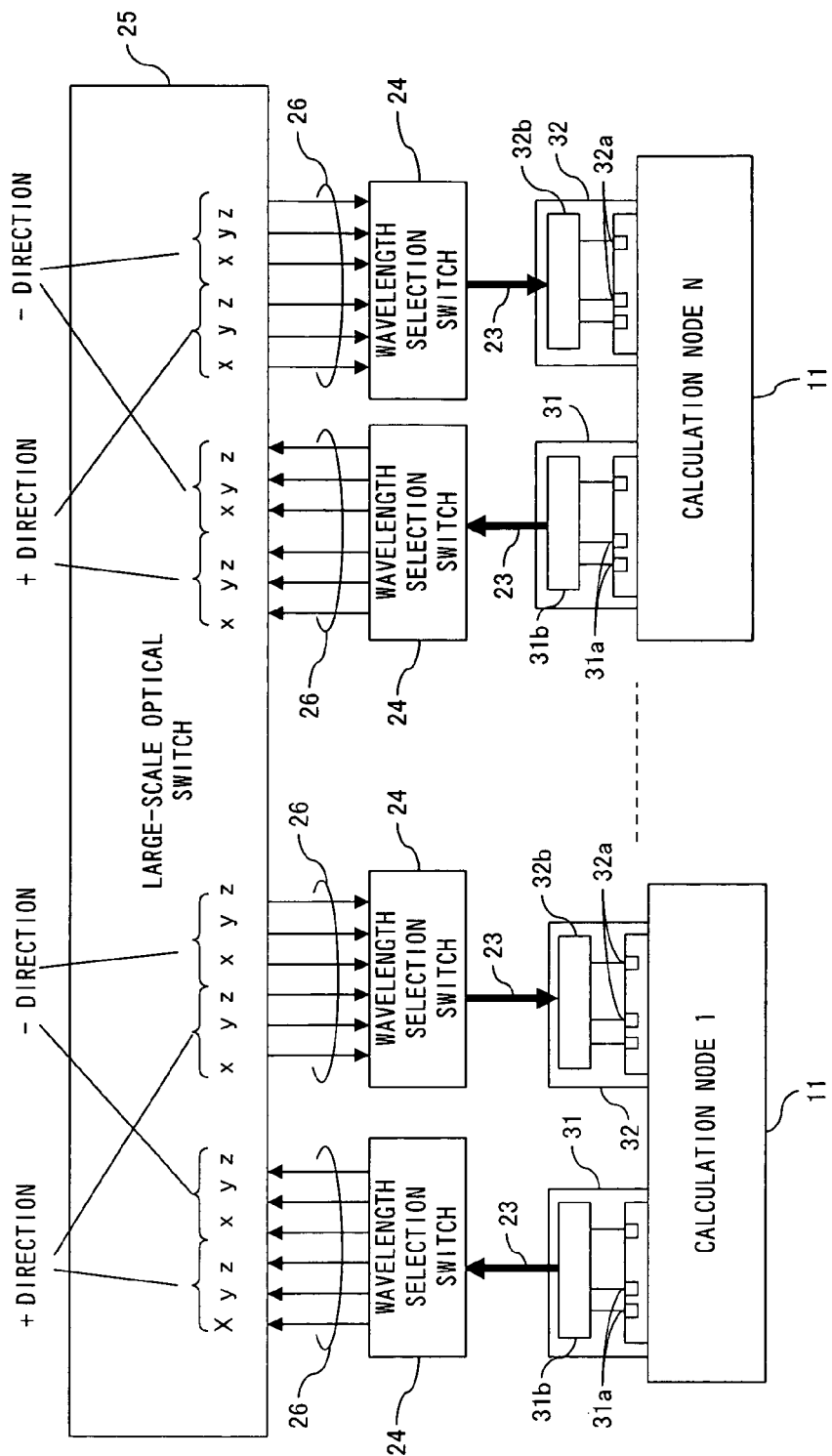
FIG. 10 is a conceptual diagram of a modified example of the information processing system when the calculation nodes are connected in a 3-D Torus.

For example, as shown in FIG. 10, a variable wavelength transmitting and receiving apparatus can be used in the optical signal output unit 31 and the optical signal input unit 32 in the individual calculation node 11.

That is, in the example in FIG. 10, the optical signal output unit 31 in the calculation node 11 comprises a plurality of tunable transmitters 31a, and a wavelength independent multiplexer 31b multiplexing optical signals output from the tunable transmitters 31a and transmitting the multiplexed signal to the optical fiber 23 (the wavelength selection switch 24). The optical signal input unit 32 comprises a wavelength independent demultiplexer 32b splitting the wavelength division multiplexed signal originating from the wavelength selection switch 24 and tunable receivers 32a receiving the demultiplexed signal.

FIG. 11 presents an example of establishment of a parallel computer with a configuration that is logically connected as a 3D-Torus in the information processing system 20, using the wavelength selection switch 24 and the large-scale optical switch 25. That is, in FIG. 11, $N_x$ wave multiplexed, $N_y$ wave multiplexed and $N_z$ wave multiplexed signals are transmitted along the X-axis, the Y-axis, and the Z-axis, respectively, and a drop wavelength (a wavelength to selectively load optical signals to a particular calculation node 11 on the 3D-Torus) corresponding to coordinates on the 3D-Torus for each calculation node 11 is set. It allows the calculation node 11 on the transmitting side to determine the node connection destination. In other words, in the case of FIG. 11, individual wavelengths are assigned to all of the calculation nodes 11 and the number of wavelengths assigned to each of the calculation nodes 11 is not limited to one wavelength.

In the following (a)~(d), detailed control procedures are described.

(a) The number of calculation nodes 11 of the destination is estimated according to a scale of an application program executed, and the shortest route is calculated.

(b) The configuration of the entire architecture is changed (optimizing the coordinate position of the destination calculation node 11) by the large-scale optical switch 25.

(c) An output wavelength corresponding to the communication destination calculation node 11 is selected in the wavelength selection switch 24, and output to the 3D-Torus.

(d) The output is received by the destination calculation node 11 corresponding to the output wavelength.

Figure 12:
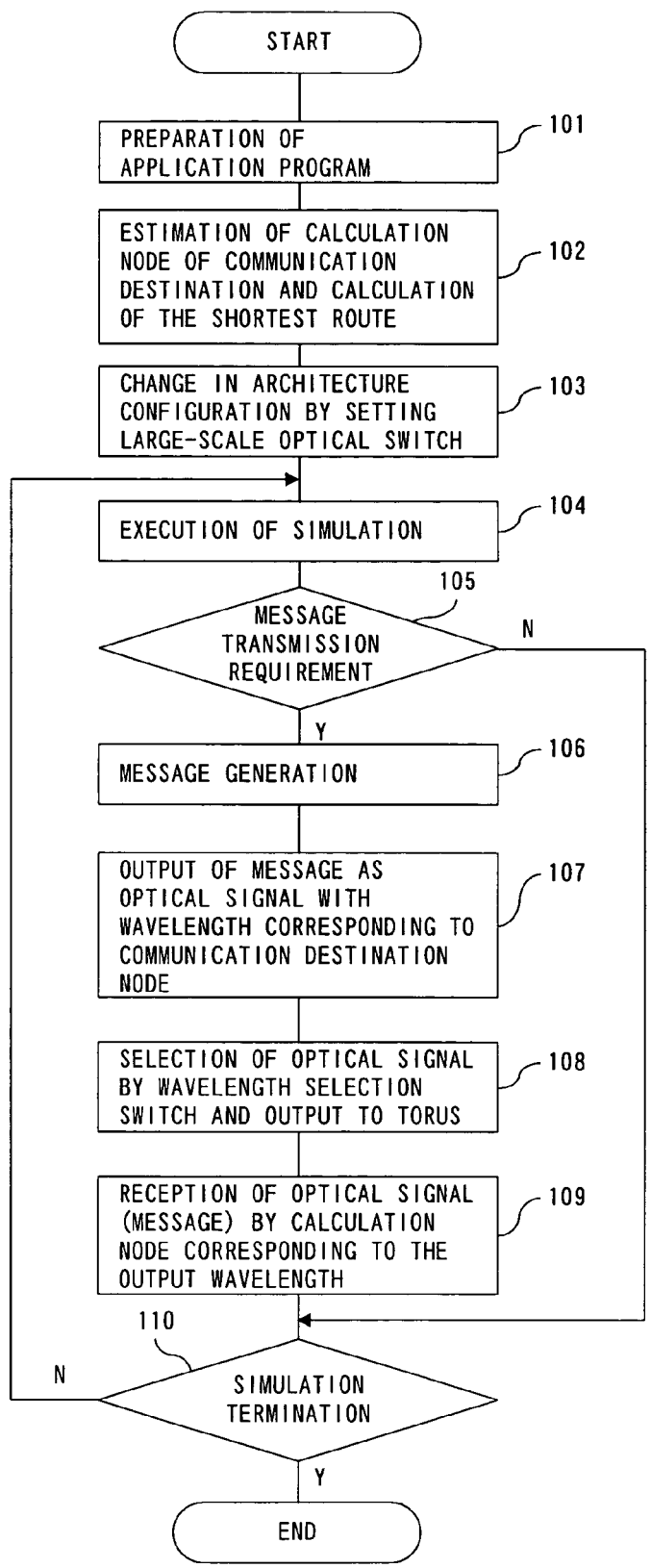
FIG. 12 is a flowchart explaining an example of control when the calculation nodes are connected in 3-D Torus.

In a flowchart in FIG. 12, more detailed explanation of the above example of control (a)~(d) is provided. First, an application program such as a simulation program to be executed by the information processing system 20 is prepared (step 101), and both the number of a plurality of calculation nodes 11 required to execute the application program and the shortest routes are calculated (step 102).

Based on the result obtained in step 102, configuration change/setting of the architecture such as optimizing individual coordinate positions of a plurality of the calculation nodes 11 belonging to a parallel execution group on the 3D-Torus is carried out with the wavelength selection switch 24 and the large-scale optical switch 25 controlled, by the administration computer 16 (step 103).

The process in step 102 can be performed by the administration computer 16 etc. in advance, and based on the result, the step 103 can be carried out by the manual effort of a system administrator.

Or the step 103 can be carried out by a particular calculation node 11 performing the step 102 and by causing the calculation node 11 to control the administration computer 16 using a predetermined control interface.

Subsequently, parallel processing is started loading the application program on the calculation node 11 (step 104), and the necessity of message exchange between the calculation nodes 11 is determined (step 105). When messaging is required, a message is generated by the calculation node 11 of the transmission source (step 106), and the content of the message is output to the wavelength selection switch 24 after converting it into an optical signal with its wavelength assigned to the calculation node 11 of the transmission source in the optical signal output unit 21 (step 107).

In the wavelength selection switch 24, the output wavelength corresponding to the calculation node 11 of the communication destination is selected, and is output to the 3D-Torus (the large-scale optical switch 25) (step 108). In the wavelength selection switch 24 of the calculation node 11 on the receiving side, an optical signal with a wavelength addressed to the calculation node 11 in the lower level of the wavelength selection switch 24 is loaded, and received through the optical fiber 23 and the optical signal input unit 22 (step 109). At that time, if the calculation node 11 on the receiving side has any reply message to the calculation node 11 of the transmission source, the message is transmitted using an optical signal with a wavelength corresponding to the calculation node 11 of the transmission source.

The above message exchange between the calculation nodes 11 is repeated until the simulation terminates (step 110).

Figure 13:
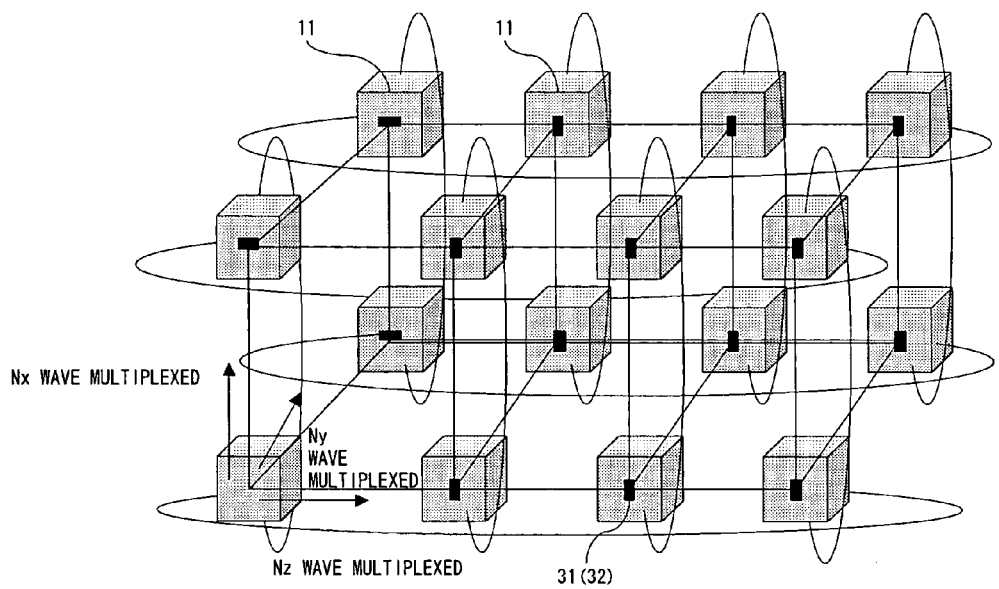
FIG. 13 is a conceptual diagram explaining a modified example of control when the calculation nodes are connected in 3-D Torus.

FIG. 13 shows another example of control in the 3D-Torus. In the example of FIG. 13, $N_x$ wave multiplexed, $N_y$ wave multiplexed and $N_z$ wave multiplexed optical signals are transmitted to the X axis, Y axis, and Z axis, respectively.

By setting drop wavelengths (loading wavelengths) so that they correspond to the 3D-Torus coordinates of individual calculation nodes 11 lying on an axis with the calculation nodes 11 lying on one axis grouped as one axis unit, the calculation node 11 of the transmission destination (node connection destination) can be determined by the calculation node 11 of the transmission source.

That is, an individual calculation node 11 located at intersection points of each axis, when relaying optical signals along one axis, on which the node lies, to another axis, multiplexed optical signals are loaded from the axis, which the transmission source calculation node 11 lies on, in axis units of the axis on which the transferring calculation node 11 lies, and transmits them to the axis on which the transferring destination lies.

In such a case, every time the transmission signals switch the axis, which the signals pass through, in the calculation node 11 located at the interception points of axes before and after the switch, attenuation of the optical signals in transmission can be prevented by executing loading from the 3D-Torus and retransmission of the transmitted optical signals.

Even in the transmission along one axis without switching axes, if a number of calculation nodes 11 are passed through, the process, in which the optical signals in transmission are loaded in calculation nodes 11 and are retransmitted to the 3D-Torus, is carried out every time the signals pass through a certain number of calculation nodes 11 in order to prevent attenuation in transmission. The following (a)~(f) are detailed procedures of such control.

(a) The number of communication destination nodes is estimated by a program, and the shortest routes are computed.

(b) The entire architectural configuration is changed (optimizing the coordinate position of the calculation node 11 of the connection destination) by the large-scale optical switch 25.

(c) Output axes X, Y and Z and wavelengths output to each axis are determined.

(d) Output wavelengths corresponding to the calculation nodes 11 of the communication destination are selected by the wavelength selection switch 24, and are output to the 3D-Torus.

(e1) In communications passing through multiple axes of X, Y or Z, every time the axis is changed at an intermediate point, optical signals with a wavelength to be passed through are loaded (dropped) in the calculation node 11, and are once again output to the 3D-Torus.

(e2) Even in the transmission along one axis, when passing through a number of calculation nodes 11, the signals suffer a loss at every individual calculation node 11, after passing through a predetermined number of steps, optical signals with a wavelength to be passed through are loaded (dropped) in the calculation node 11, and are once again output to the 3D-Torus.

(f) The optical signals are received at the destination calculation node 11 corresponding to the output wavelength.

Figure 14:
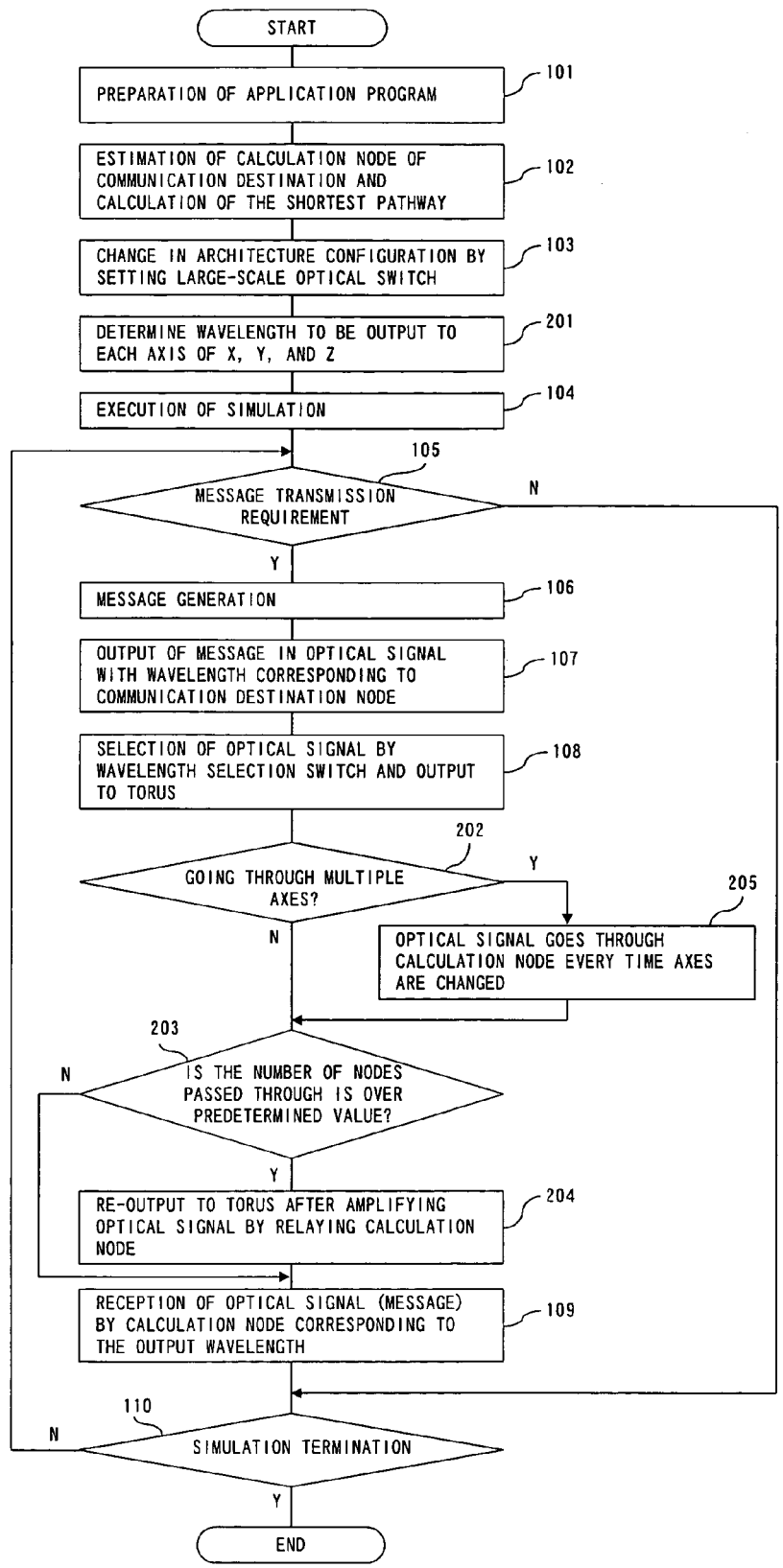
FIG. 14 is a flowchart explaining a modified example of control when the calculation nodes are connected in 3-D Torus.

The above controls of (a)~(f) are explained in further details with reference to the flowchart in FIG. 14. The processes common to the above flowchart in FIG. 12 are given the same labels, redundant explanations are omitted, and only differing steps are explained.

In advance of the execution of the simulation (step 104), the wavelengths of the optical signals output to each of X, Y and Z axes are determined (step 201).

After the optical signals are selected by the wavelength selection switch 24 in accordance with the destination calculation node 11 and are output to the 3D-Torus (step 108), in this control example, whether or not the pathway to the destination calculation node 11 goes through multiple axes is determined (step 202). When the pathway passes through multiple axes, every time it changes axis at an intermediate point, optical signals passing through a calculation node 11, are loaded in the calculation node 11 and are once again output to the 3D-Torus. By so doing, attenuation of the transmitted optical signals can be prevented (step 205).

When the pathway passes through a single axis (i.e. does not go through multiple axes) however the number of the calculation nodes 11, which the optical signals pass through on the transmission pathway to the destination calculation node 11, has a predetermined value or above (step 203), the signals are loaded in a calculation node 11 on the pathway, and are retransmitted to the 3D-Torus (step 204).

Figure 15:
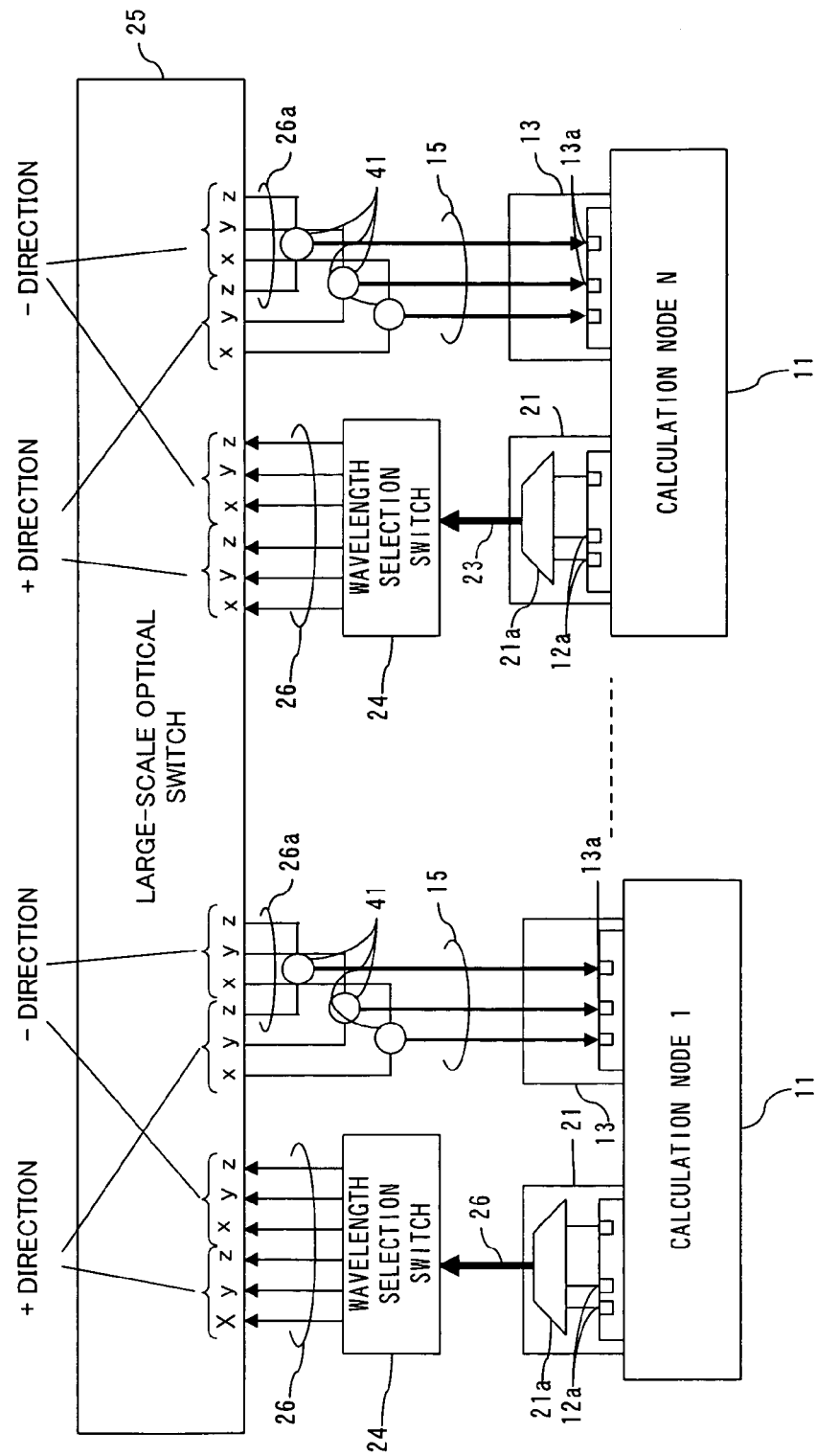
FIG. 15 is a conceptual diagram explaining an additional modified example of control when the calculation nodes are connected in 3-D Torus.

An example of a configuration of an information processing system 30 realizing the controls in the flowchart of FIG. 14 is described in FIG. 15. The control by the administration computer 16 is not shown in FIG. 15, but is carried out in a similar way to the above described information processing system 20 etc.

In the case of the information processing system 30, the input ports of each of the positive and negative axes (X, Y and Z) of individual calculation nodes 11 in the large-scale optical switch 25 are bypassed in the optical fiber 26a. And in the middle of the pathway of the optical fiber 26a for each axis lies a fixed wavelength selector 41. The fixed wavelength selector 41, carries out the operation of letting the optical signals pass through the optical fiber 26a without change, and the operation of individually loading the optical signals with a particular wavelength to the fixed wavelength receiver 13a of the optical signal input unit 13 through the optical fiber 15.

The control of the optical signal loading operation described above in the fixed wavelength selector 41 can be performed by the administration computer 16 through an undescribed control port configured in the fixed wavelength selector 41.

In the wavelength selection switch 24, of the information processing system 30, the wavelength division multiplexed optical signals output from one of the calculation nodes 11 select the axis to which they are output on the 3D-Torus and the number of wavelengths. Subsequently, the signals pass through the optical fiber 26a in a receiver of the connected calculation node 11 in the large-scale optical switch 25, and the fixed wavelength selector 41 loads (drops) only the optical signals with a predetermined wavelength letting the optical signals with other wavelengths pass through. The contents of the dropped signals are confirmed by the calculation node 11, and are received if the optical signal is addressed to the calculation node 11. If the optical signal is addressed to another calculation node 11, the signal is again output from the optical signal output unit 21 to the optical fiber 26. The signal selects the axis to which it is output on the 3D-Torus and the number of wavelengths in the wavelength selection switch 24, and the transfer of the optical signal to the addressed calculation node 11 is continued. Afterward, the above operations are repeated until the signal reaches the addressed calculation node 11.

In the above case, dummy calculation nodes, which do not comprise calculation functions but comprise only amplification functions of the optical signal, can be mixed with the calculation nodes 11 instead of some of the calculation nodes 11, for the purpose of having the dummy calculation nodes carry out the above-described amplification of the optical signal along the transmission pathway.

As explained above, in the present embodiment, by the combination of wavelength division multiplexing of a plurality of optical signals and switching of the multiplexed optical signals, a parallel computer can be realized without increasing the number or the length of optical fiber etc., in establishing, for example, a parallel computer connecting a plurality of calculation nodes 11 to each other in architectures such as the crossbar connection, the full-mesh connection and the 3D-Torus connection.

In other words, parallel computers connecting more calculation nodes 11 can be established by using optical fibers of a prescribed number and length, and improvement of performance of the parallel computers can be achieved.

Communication between a plurality of the calculation nodes 11 is carried out by wavelength division multiplexing, by changing the degree of multiplexing, communication capacity in individual optical transmission paths between individual calculation nodes 11 can be separately increased or decreased, and optimization of the communication capacity of each optical transmission path in the architecture can be realized in accordance with individual architecture and characteristics of application programs etc.

It is obvious that the present invention is not to be limited to the configuration exemplified in the embodiments but is to be construed as embodying various modifications that may be made without departing from the basic teaching herein set forth.

According to the present invention, flexible and high-speed change of communication capacity in communication pathways between calculation nodes is possible in an information processing system carrying out parallel processing using a plurality of calculation nodes connected through communication pathways.

Also, performance of the information processing system can be improved by increasing the calculation nodes without increasing the number or the length of the communication cables.

What is claimed is:

1. An information processing system with a plurality of calculation nodes connected to each other through an optical transmission path, in which the optical transmission comprises:
   a plurality of first optical path switching units for switching connections between a plurality of the calculation nodes; and
   a plurality of second optical path switching units for wavelength division multiplexing optical signals transmitted and received between a plurality of the calculation nodes as selected using a wavelength of each of the optical signals and for variably controlling communication capacity to the calculation node of an individual connection destination in units of wavelength, wherein
   at least one of the plurality of the second optical path switching units is provided to each of an input unit and an output unit of optical signals in each calculation node,
   between the plurality of first optical path switching units and the plurality of second optical path switching units, a full-mesh connection, to which all of the calculation nodes are connected at the same time through the plurality of the second optical path switching units, is configured,
   the plurality of calculation nodes configure a 3-dimensional-Torus connection through at least one of the plurality of the first optical path switching units, at least one of the plurality of the second optical path switching units and the optical transmission path, using wavelengths of optical signals,
   optical signals in groups of different wavelengths are assigned to each of positive and negative connection directions of three axes, X, Y and Z, in the 3-dimensional-Torus connection, and communication between the plurality of calculation nodes by wavelength division multiplexing is performed,
   a drop wavelength corresponding to a coordinate on the 3-dimensional-Torus connection for each calculation node is set, and a calculation node of a transmission side is allowed to determine a node connection destination,
   a number of calculation nodes of the node connection destination is estimated according to a scale of an application program which is being executed, and a shortest route is calculated,
   a configuration of the 3-dimensional-Torus connection is changed by the plurality of second optical path switching units to optimize a coordinate of a communication destination calculation node,
   an output wavelength corresponding to the communication destination calculation node is selected and output to the 3-dimensional-Torus connection, and
   the output is received by the communication destination calculation node corresponding to the output wavelength.

2. An information processing system with a plurality of calculation nodes connected to each other through an optical transmission path, in which the optical transmission comprises:
   a plurality of first optical path switching units for switching connections between a plurality of the calculation nodes; and
   a plurality of second optical path switching units for wavelength division multiplexing optical signals transmitted and received between a plurality of the calculation nodes as selected using a wavelength of each of the optical signals and for variably controlling communication capacity to the calculation node of an individual connection destination in units of wavelength, wherein
   at least one of the plurality of the second optical path switching units is provided to each of an input unit and an output unit of optical signals in each calculation node,
   between the plurality of first optical path switching units and the plurality of second optical path switching units, a full-mesh connection, to which all of the calculation nodes are connected at the same time through the plurality of the second optical path switching units, is configured,
   the plurality of calculation nodes configures a 3-dimensional-Torus connection through at least one of the plurality of the first optical path switching units, at least one of the plurality of the second optical path switching units and the optical transmission path, using wavelengths of optical signals, optical signals in groups of different wavelengths are assigned to each of positive and negative connection directions of three axes, X, Y and Z, in the 3-dimensional-Torus connection, and communication between the plurality of calculation nodes by wavelength division multiplexing is performed, a drop wavelength corresponding to a coordinate on the 3-dimensional-Torus connection of individual calculation nodes lying on an axis with calculation nodes lying on one axis grouped as one axis unit is set, and a calculation node of a transmission destination is determined by a calculation node of a transmission source, a number of calculation nodes of the node connection destination is estimated according to a scale of an application program which is being executed, and a shortest route is calculated, a configuration of the 3-dimensional-Torus connection is changed by the plurality of second optical path switching units to optimize a coordinate of a communication destination calculation node, output axes X, Y and Z and wavelengths output to each axis are determined, an output wavelength corresponding to a calculation nodes of the communication destination calculation node is selected output to the 3-dimensional-Torus connection, in communications passing through multiple axes of X, Y or Z, when the axis is changed at an intermediate point, optical signals with a wavelength to be passed through are dropped in a calculation node, and are once again output to the 3-dimensional-Torus connection, in the transmission along one axis, when passing through a number of calculation nodes, signals suffer a loss at every individual calculation node, after passing through a predetermined number of steps, optical signals with a wavelength to be passed through are dropped in a calculation node, and are once again output to the 3-dimensional-Torus connection, the output is received by the communication destination calculation node corresponding to the output wavelength.

3. An information processing system control method for controlling an information processing system with a plurality of calculation nodes connected to each other through an optical transmission path, comprising:

switching connections between the plurality of calculation nodes using a plurality of first optical path switching units; and wavelength division multiplexing optical signals transmitted and received between the plurality of calculation nodes as selected using a wavelength of each of the optical signals, and variably controlling communication capacity to the calculation node of an individual connection destination in units of wavelength using a plurality of second optical path switching units, wherein at least one of the plurality of the second optical path switching units is provided to each of an input unit and an output unit of optical signals in each of the plurality of calculation nodes, between the plurality of the first optical path switching units and the plurality of second optical path switching units, a full-mesh connection, to which all of the plurality of calculation nodes are connected at the same time through the plurality of second optical path switching units, is configured, the plurality of calculation nodes configures a 3-dimensional-Torus connection through at least one of the plurality of the first optical path switching units, at least one of the plurality of the second optical path switching units and the optical transmission path, using wavelengths of optical signals, optical signals in groups of different wavelengths are assigned to each of positive and negative connection directions of three axes, X, Y and Z, in the 3-dimensional-Torus connection, and communication between the plurality of calculation nodes by wavelength division multiplexing is performed, a drop wavelength corresponding to a coordinate on the 3-dimensional-Torus connection for each calculation node is set, and a calculation node of a transmission side is allowed to determine a node connection destination, a number of calculation nodes of the node connection destination is estimated according to a scale of an application program which is being executed, and a shortest route is calculated, a configuration of the 3-dimensional-Torus connection is changed by the plurality of second optical path switching units to optimize a coordinate of a communication destination calculation node, an output wavelength corresponding to the communication destination calculation node is selected and output to the 3-dimensional-Torus connection, and the output is received by the communication destination calculation node corresponding to the output wavelength.

4. An information processing system control method for controlling an information processing system with a plurality of calculation nodes connected to each other through an optical transmission path, comprising:

switching connections between the plurality of calculation nodes using a plurality of first optical path switching units; and wavelength division multiplexing optical signals transmitted and received between the plurality of calculation nodes as selected using a wavelength of each of the optical signals, and variably controlling communication capacity to the calculation node of an individual connection destination in units of wavelength using a plurality of second optical path switching units, wherein at least one of the plurality of the second optical path switching units is provided to each of an input unit and an output unit of optical signals in each of the plurality of calculation nodes, between the plurality of the first optical path switching units and the plurality of second optical path switching units, a full-mesh connection, to which all of the plurality of calculation nodes are connected at the same time through the plurality of second optical path switching units, is configured, the plurality of calculation nodes configures a 3-dimensional-Torus connection through at least one of the plurality of the optical path switching units, using wavelengths of optical signals, optical signals in groups of different wavelengths are assigned to each of positive and negative connection directions of three axes, X, Y and Z, in the 3-dimensional-Torus connection, and communication between calculation nodes is performed by wavelength division multiplexing, a drop wavelength corresponding to a coordinate on the 3-dimensional-Torus connection of individual calculation nodes lying on an axis with calculation nodes lying on one axis grouped as one axis unit is set, and a calculation node of a transmission destination is determined by a calculation node of a transmission source, a number of calculation nodes of the node connection destination is estimated according to a scale of an application program which is being executed, and a shortest route is calculated, a configuration of the 3-dimensional-Torus connection is changed by the plurality of second optical path switching units to optimize a coordinate of a communication destination calculation node, output axes X, Y and Z and wavelengths output to each axis are determined, an output wavelength corresponding to a calculation nodes of the communication destination calculation node is selected output to the 3-dimensional-Torus connection, in communications passing through multiple axes of X, Y or Z, when the axis is changed at an intermediate point, optical signals with a wavelength to be passed through are dropped in a calculation node, and are once again output to the 3-dimensional-Torus connection, in the transmission along one axis, when passing through a number of calculation nodes, signals suffer a loss at every individual calculation node, after passing through a predetermined number of steps, optical signals with a wavelength to be passed through are dropped in a calculation node, and are once again output to the 3-dimensional-Torus connection, the output is received by the communication destination calculation node corresponding to the output wavelength.

* * * * *